Figure 1:
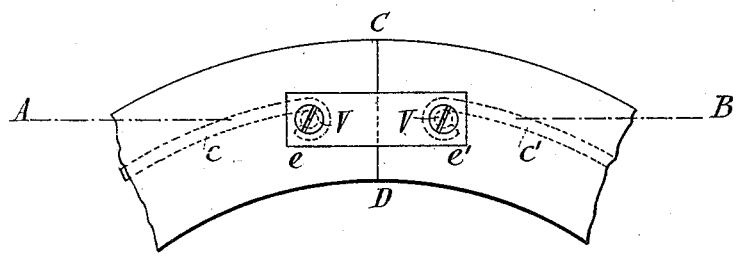

(No Model.)

E. E. A. SOREL.
WHEEL.

No. 441,041. Patented Nov. 18, 1890.

Witnesses.
J. W. Whitaker,
D. E. Reinohl

Inventor.
Emile E. A. Sorel,
By his atty
Whitaker & Prevost

UNITED STATES PATENT OFFICE.

EMILE EUGÈNE ALBERT SOREL, OF PARIS, FRANCE.

WHEEL.

SPECIFICATION forming part of Letters Patent No. 441,041, dated November 18, 1890.

Application filed April 9, 1890. Serial No. 347,195. (No model.) Patented in Belgium November 20, 1889, No. 88,537.

*To all whom it may concern:*

Be it known that I, EMILE EUGÈNE ALBERT SOREL, a citizen of the Republic of France, residing at Paris, France, have invented new and useful Improvements in Wheels, (for which I have obtained a patent in Belgium, No. 88,537, dated November 20, 1889,) of which the following is a specification.

This invention relates to the manufacture of wheels for carriages and other vehicles, pulleys, grindstones, emery-wheels, and the like; and the invention consists in manufacturing such wheels mainly from agglomerates of cork. As a uniting medium I make use of glue, gum, or cement, preferably cement, the base of which is oxychloride of magnesium, because the agglutinative properties of such cement are very great and it is easily applied.

In manufacturing wheels for carriages, wagons, and the like I employ the following or an analogous formula: calcined magnesia, about one hundred parts, by weight; powdered limestone or other inert substance, about one hundred parts, by weight; cork, granulated or in the form of cuttings, shavings, or the like, about forty parts, by weight; and a solution of chloride of magnesium at from 20° to 35° Baumé, about one hundred parts, by weight. The whole is mixed like ordinary mortar, and is then molded under pressure. The wheel is then taken from the mold and is hooped or tired in any suitable manner. I sometimes run the mixture directly into the rim or tire of the wheel, and in such case I coat the interior of the hoop or tire with clear cement to increase its adherence to the body of the wheel. The nave or stock is similarly treated.

In manufacturing driving-pulleys they may be made with or without a metal case or jacket. In the latter case they are provided with a rough surface, over which the driving band or belt will not slip. This roughness of surface allows of them being employed as friction-gearing, if required.

In manufacturing driving-pulleys I employ for forming the body of the pulley the following formula, which will be found to give a light and strong agglomerate, videlicet: magnesia, about one hundred and fifty parts, by weight; powdered limestone, about one hundred parts, by weight; granulated cork, about one hundred and twenty-five parts, by weight; and chloride of magnesium at 30° Baumé, about one hundred and seventy parts, by weight.

For forming the outer part or circumference of the wheel the quantity of cork employed should be reduced by about one-half, so as to obtain a finer and harder composition. In the center of the mold I advantageously place a metal bush or sleeve, which forms an opening for the shaft, while to strengthen the pulley one or more metal rings are embedded therein. The pulleys as well as the other wheels can be made solid or open and with naves and spokes or arms of metal or of wood. I sometimes form the naves of mortar, strengthened or not with metal rings. The mortar should be very hard for the purpose of causing the arms or spokes to be firmly connected thereto. The improved pulleys can be made in two parts when it is desired to mount them on shafts without dismounting the latter, and when the pulleys are very large they may be advantageously made of a larger number of parts, the said parts in both cases being preferably connected together by the improved means hereinafter described with reference to the accompanying drawings, in which—

Figure 2:
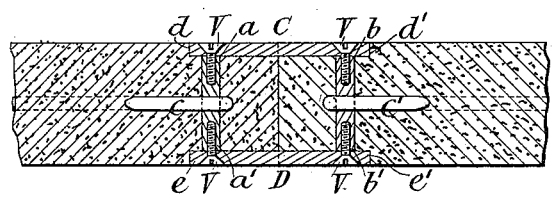
Figure 3:
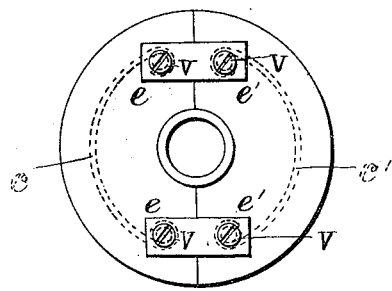

Figure 1 is a view of part of a pulley, the parts forming the same being rigidly connected together by my improved means. Fig. 2 is a section on line A B of Fig. 1. Fig. 3 is a view of my completed pulley.

$c\ c'$ are the ends of segments of metal rings, embedded in the mass of which the wheel is composed, which segments hook onto pins or bolts $a\ a'\ b\ b'$. These pins are connected by plates $d\ d'\ e\ e'$ and screws V. By unscrewing the screws V and removing the plates the pulley can be taken apart at C D. It will be obvious that a pulley constructed in parts connected together in this manner will possess great strength, owing to the ring-segments forming a chain embedded in the interior. In some cases the pins may be dispensed with by connecting the ends of the metal segments directly to the parts $d\ d'\ e\ e'$.

The junction of the ring-segments $c\ c'$, instead of being effected through the plane surfaces or sides of the pulley, can be effected on the periphery, in which case the plates $d\ d'\ e\ e'$ would be arched and the pins $a\ a'\ b\ b'$ curved to join them together, or the pins could be dispensed with and the ends of the segments directed toward the external or internal circumference of the rim could be screwed directly to the plate, which would unite them. The arms or spokes could be put in place when molding the rim, or they could be cemented or screwed on the latter when it has hardened or set. The outer ends of the arms or spokes should be bent into a kind of hook, so that they may be connected to the ring embedded in the mortar, whereby the strength of the pulley will be increased.

In manufacturing polishing-wheels I employ a soft composition, whereby I obtain a yielding surface. The following formula gives good results: magnesia, about one hundred parts, by weight; granulated cork, about one hundred and fifty parts, by weight; and chloride of magnesium at 30° Baumé, about one hundred parts, by weight. When the wheel has set, I coat it with glue, over which I sprinkle emery or other suitable cutting or grinding material in the manner usually employed when manufacturing ordinary polishing-wheels. To provide a more pliant surface, the periphery of the polishing-wheel can be made in segments of cork, which are adjusted and cemented in position.

In manufacturing grinding-wheels I mix the cork with grinding or cutting material— such as emery, silex, or the like—whereby I obtain light grinding-wheels which do not become so greasy as ordinary grinding-wheels. The following formula is given as an example of this composition: magnesia, about one hundred parts, by weight; emery, about four hundred parts, by weight; granulated cork, about one-half the quantity, by volume, of emery; and chloride of magnesium at 30° Baumé, from about eighty to one hundred parts, by weight.

A further improvement consists in making the central part of such wheels of cork or of agglomerated light materials, whereby the wheels are rendered much lighter and can be better compressed between plates. When the wheels become worn through to the cork, they can be renewed by furnishing the central part with a fresh surface of grinding or cutting material.

Having now particularly described and ascertained the nature of my said invention and in what manner the same is to be performed, I declare that what I claim is—

1. A wheel or pulley having its main portion composed of finely-divided cork united by a cement, substantially as described.

2. A wheel or pulley having its main portion composed of finely-divided cork, and a binding-cement comprising oxychloride of magnesium, substantially as described.

3. A wheel or pulley having its main portion composed of finely-divided cork, an abrasive material, and a binding-cement.

4. A sectional wheel or pulley composed of finely-divided material united by a binding-cement, a sectional metallic ring embedded therein, and means for uniting the adjacent ends of the sections of said ring, substantially as described.

5. A sectional wheel or pulley composed of finely-divided material united by a binding-cement, a sectional metallic ring embedded therein, pins engaging the ends of said ring-sections, and plates connecting said pins, substantially as described.

EMILE EUGÈNE ALBERT SOREL.

Witnesses:
G. POUGÉ,
GALLIOL.